(12) United States Patent
Hong et al.

(10) Patent No.: US 10,013,020 B2
(45) Date of Patent: Jul. 3, 2018

(54) ELECTRONIC DEVICE WITH FLEXIBLE DISPLAY

(71) Applicant: HEWLETT-PACKARD DEVELOPMENT COMPANY, L.P., Houston, TX (US)

(72) Inventors: Insun Hong, Houston, TX (US); Dimitre Mehandjiysky, Houston, TX (US); Mark David Senatori, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/109,908

(22) PCT Filed: Jan. 29, 2014

(86) PCT No.: PCT/US2014/013586
§ 371 (c)(1),
(2) Date: Jul. 6, 2016

(87) PCT Pub. No.: WO2015/116062
PCT Pub. Date: Aug. 6, 2015

(65) Prior Publication Data
US 2016/0334836 A1    Nov. 17, 2016

(51) Int. Cl.
*G06F 1/16* (2006.01)

(52) U.S. Cl.
CPC .......... *G06F 1/1616* (2013.01); *G06F 1/1652* (2013.01); *G06F 1/1681* (2013.01); *G06F 1/1686* (2013.01)

(58) Field of Classification Search
CPC .... G06F 1/1652; G06F 1/1616; G06F 1/1686; G06F 1/1681; G06F 1/1641; H04M 1/0268; H04M 1/0216; H04M 1/022; H04M 1/0214
See application file for complete search history.

(56) References Cited

U.S. PATENT DOCUMENTS

| | | | |
|---|---|---|---|
| 5,719,799 A * | 2/1998 | Isashi | G06F 1/1618 345/169 |
| 6,791,597 B2 * | 9/2004 | Ando | H04N 7/142 348/14.01 |
| D580,432 S * | 11/2008 | Yun | D14/345 |
| 8,228,667 B2 | 7/2012 | Ma | |

(Continued)

FOREIGN PATENT DOCUMENTS

| KR | 10-2010-0025360 | 3/2010 |
|---|---|---|
| WO | WO 2013-033479 | 3/2013 |

*Primary Examiner* — Dimary Lopez Cruz
*Assistant Examiner* — Abhishek Rathod
(74) *Attorney, Agent, or Firm* — HPI Patent Department

(57) ABSTRACT

An electronic device is provided in accordance with an aspect of the present disclosure. The electronic device includes a cover and a flexible display. The cover includes a first section, a second section connected to the first section by a first connection mechanism, and a third section connected to the second section by a second connection mechanism. The flexible display is attached to at least a portion of the first section and a portion of the third section. The flexible display is positioned in a first orientation when the first and the third sections are in a plane and in a second orientation when the sections are in different planes.

15 Claims, 4 Drawing Sheets

(56) References Cited

U.S. PATENT DOCUMENTS

| | | | |
|---|---|---|---|
| 8,385,055 B2 | 2/2013 | Kao et al. | |
| 9,442,530 B2* | 9/2016 | Maatta | G06F 1/1656 |
| 2007/0097014 A1* | 5/2007 | Solomon | G06F 1/1616 |
| | | | 345/1.1 |
| 2008/0300031 A1* | 12/2008 | Cho | H04M 1/0216 |
| | | | 455/575.3 |
| 2009/0040707 A1* | 2/2009 | Karashima | G06F 1/1616 |
| | | | 361/679.27 |
| 2010/0232100 A1 | 9/2010 | Fukuma et al. | |
| 2011/0188189 A1* | 8/2011 | Park | G05B 11/01 |
| | | | 361/679.05 |
| 2012/0162049 A1 | 6/2012 | Aoki et al. | |
| 2012/0236484 A1* | 9/2012 | Miyake | G06F 1/1616 |
| | | | 361/679.01 |
| 2012/0262870 A1* | 10/2012 | Leung | G06F 1/1626 |
| | | | 361/679.27 |
| 2012/0314399 A1 | 12/2012 | Bohn et al. | |
| 2013/0148272 A1* | 6/2013 | Lin | G06F 1/1616 |
| | | | 361/679.01 |
| 2013/0219663 A1* | 8/2013 | Cai | G06F 1/1681 |
| | | | 16/371 |
| 2013/0221840 A1* | 8/2013 | Oh | H01L 51/5237 |
| | | | 313/511 |
| 2014/0126133 A1* | 5/2014 | Griffin | G06F 1/1652 |
| | | | 361/679.27 |
| 2014/0196254 A1* | 7/2014 | Song | E05D 3/14 |
| | | | 16/302 |
| 2014/0355195 A1* | 12/2014 | Kee | G06F 1/1616 |
| | | | 361/679.27 |

* cited by examiner

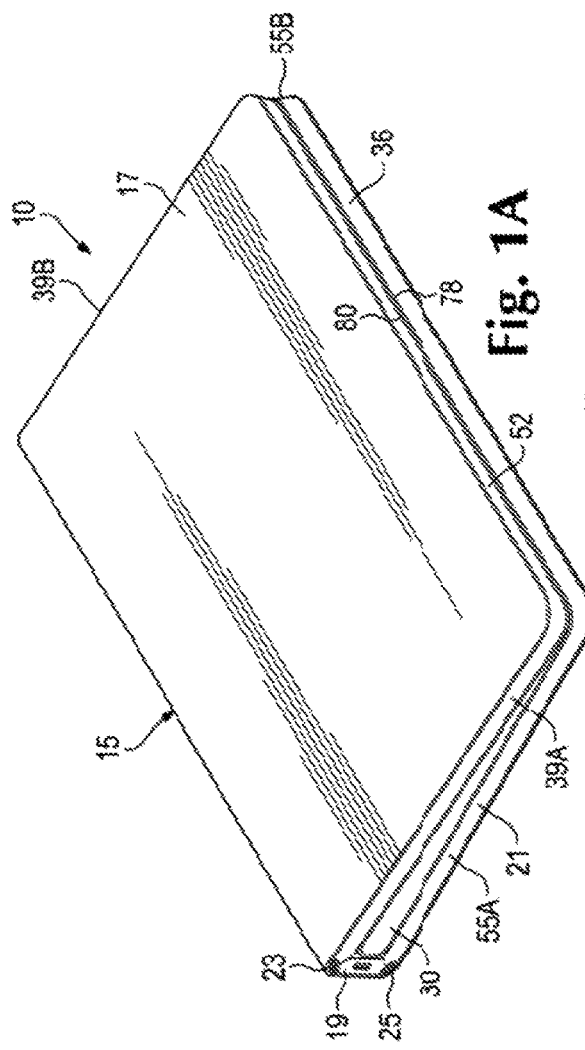
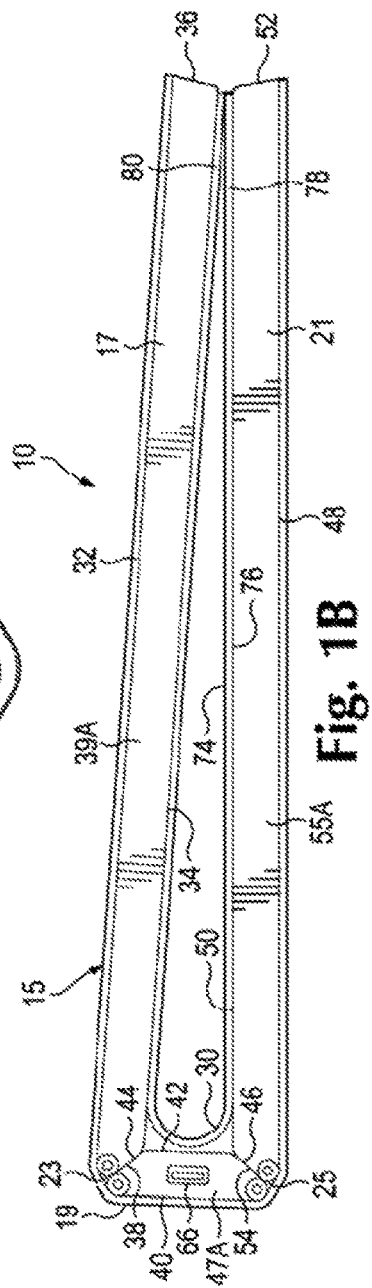

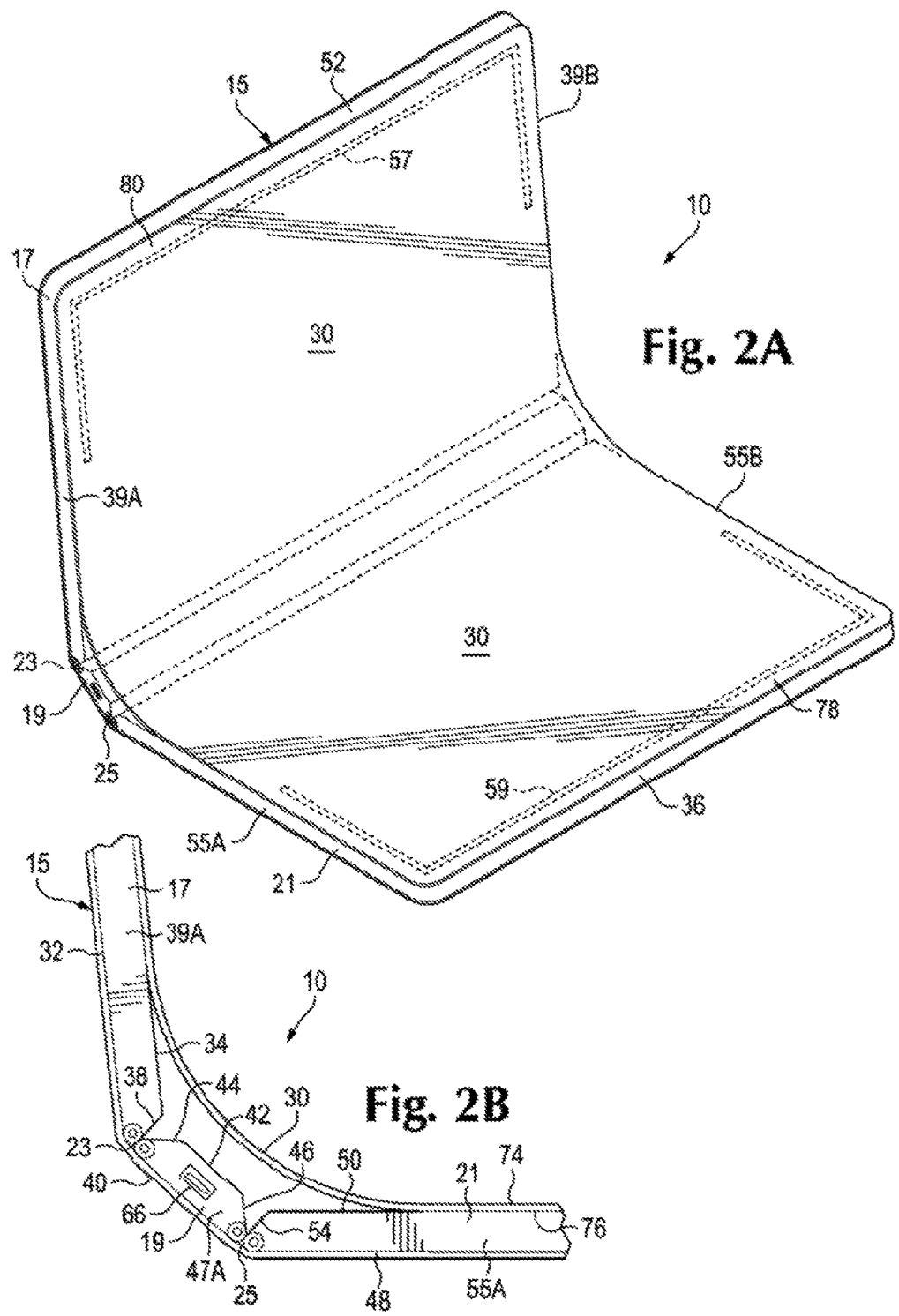

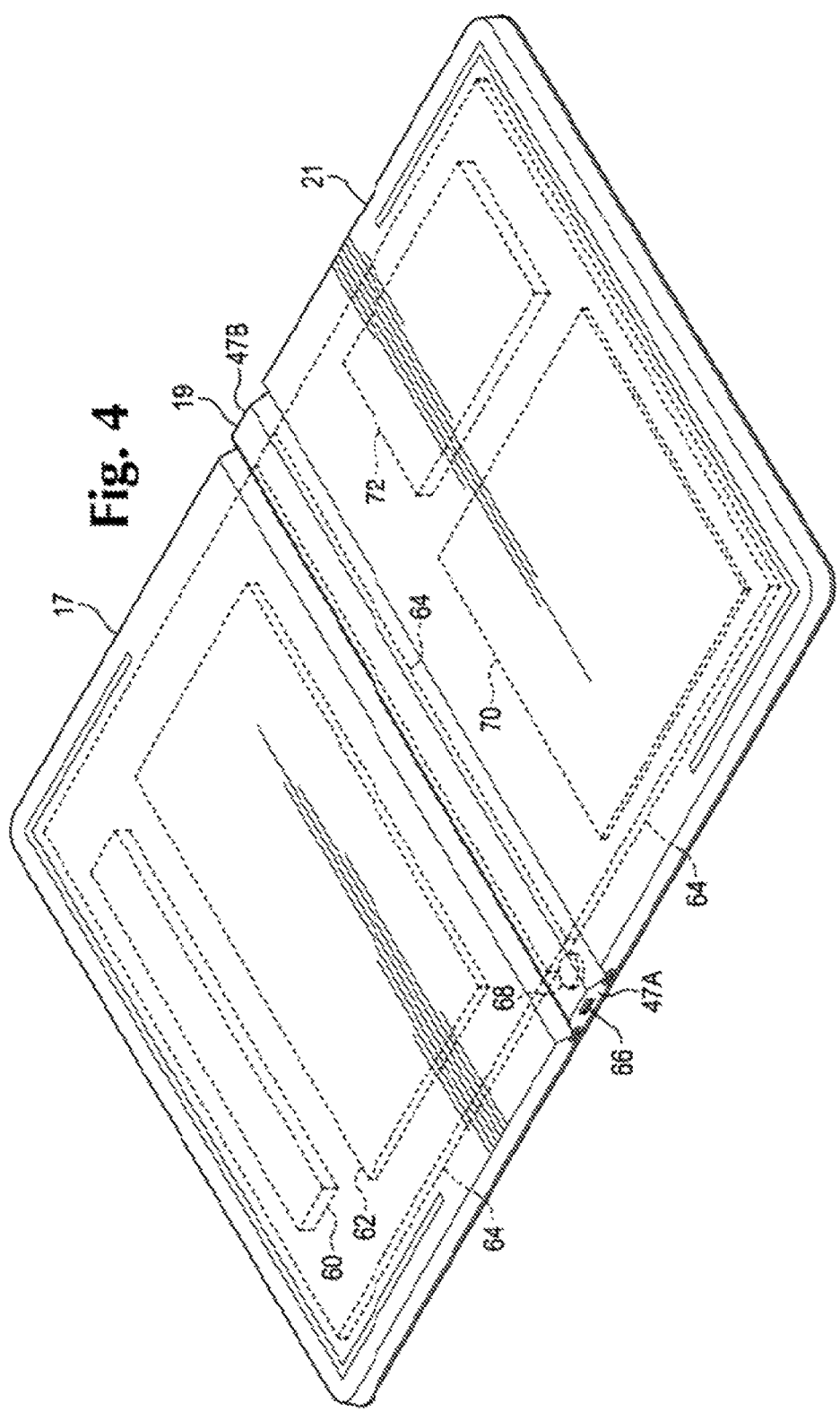

ELECTRONIC DEVICE WITH FLEXIBLE DISPLAY

BACKGROUND

Increasing number of today's use carry at least one portable electronic device that is equipped with a diverse set of functions. These devices can communicate with, each other, reach the Internet, perform different tasks, or access dons services through networks. These portable electronic devices have become essential personal accessories, connecting users to friends, work, and entertainment.

BRIEF DESCRIPTION OF THE DRAWINGS

FIG. 1A is a perspective view of are electron is device in a first position according to an example implementation.

FIG. 1B is a side view of the electronic device of FIG. 1A according to example implementation.

FIG. 2A is an alternative perspective view of the electronic device of FIG. 1A in a second position according to an example implementation.

FIG. 2B is a side view of the electronic device in the second position according to an example implementation.

FIG. 3A is an alternative perspective view of the electronic device FIG. 1A in a third position according to an example implementation.

FIG. 3B is a side view of the electronic device in the third position according to an example implementation.

FIG. 4 is a perspective view of at electronic device cover according to an example implementation.

DETAILED DESCRIPTION

With the recent improvements in technology, portable electro devices (e.g., tablets, laptops, smartphones, etc.) continue to play an increasing role in people's life. Different users rely on different type of portable device devices for many day-to-day activities and work related tasks.

Portable electronic devices come in different sizes, forms, and may include different technical features. Due to the proliferation of electronic devices, their technological capabilities are continuously increasing. Regardless of the type of portable electronic devices, one of the main advantages of these devices is portability. Thus, users generally carry these devices on a daily basis between many different locations. This creates a risk of damaging the portable devices if the devices are scratched, dropped, stepped on, hit, etc. Consequently, it is desirable that these devices are well protected.

Many users of such portable electronic device may use protective accessories (e.g., bags, cases, covers, etc.) when carrying these devices. However, such protective accessories may be inconvenient to carry and they may not securely engage the portable electronic devices when the devices are inserted in these accessories. A secure attachment between the portable electronic devices and the protective accessories is very important because users generally carry the portable electronic devices by holding the protective accessories for at least a portion of the protective accessories). Thus, if the electronic devices are not securely connected to the protective accessories, the electronic device may detach from the protective accessory and may be damaged.

In addition, many of the recently manufactured portable electronic devices (e.g., tablets, smartphones, etc.) include larger and more sophisticated processors, hard drives, and memories as compared to similar older devices. Therefore, these devices now have improved operating capabilities and may be used to perform many functions or tasks that are usually performed with desktop computers. Many users now desire to utilize these efficient portable electronic device as their primary office or home devices. In addition, these devices continue to be heavily used for entertaining (e.g., watching movies, browsing the internet, etc.). Thus, users generally prefer portable electronic devices with larger displays that are more convenient for work and/or entertainment purposes. However, since one of the main advantages of these devices is portability, it is difficult to manufacture portable devices with larger displays that can easily be protected during transportation.

Further, there is a tendency that many of the new portable electronic devices are constructed to be very thin. This is due to user's demand for light portable electronic devices that are easy to carry and do not take up too much space. Constructing a thin portable electronic device usually means that the device includes a housing with a very small width. One disadvantage of constructing very thin portable electronic devices is that such devices can not include many standard input/output ("I/O") ports (e.g., a High-Definition Multimedia Interface (HDMI) port, a Universal Serial Bus (USB) port, etc.). In addition, most current portable electronic devices have very limited space for memory and speakers due to the small width of the devices. That limits the functionality of the portable electronic devices and makes them less desirable.

With the rapid development of flexible displays, it is desirable to develop portable electronic device that address the above-identified issues and that offers consumers a useful, reliable, and easy to protect device. Flexible displays generally include electronic displays that are not fixed as the traditional flat screen displays but can bend when force is applied to a portion of the flexible display.

The present description is directed to an electronic computing device and to cover for an electronic computing device. The description proposes a novel and previously unforeseen electronic computing device that includes a seamless flexible display and can transition the display between various orientations. The electronic device allows the display to transition from a closed position (where the display is protected) to an open position (e.g., where the display is substantially flat), and to various positions/orientations in between. Very often, users of portable electronic devices may want to switch the orientation or the position of the display. However, in many cases, switching the operation of the display involves repositioning a supporting accessory for the device (e.g., an external protective cover, a stand, etc.). This may require one or more of the following removing the device from the case/stand, adjusting the position of the case/stand (e.g., by mechanically moving specific portions of the stand to different positions), rotating the device, and reattaching the device on the stand. Repeating this process many times throughout the day may be cumbersome to the users of such electronic devices. The proposed device eliminates this is by offering a convenient way to switch the orientation of the display by simply adjusting the display and the cover supporting the display.

The proposed electronic device offers a configuration that includes a cover that is securely attached to a seamless flexible display. The configuration allows a user to "fold" the cover and the display together when the device is not used. That way, the electronic device becomes smaller in size, can be easily transported, and the display is protected by the cover. When a user wishes to use the electronic device, the user may "unfold" the device and position the flexible display in various orientations without the need to mechanically adjust external elements (e.g., cover, stand, etc.). Due to the configuration of the device and the structure of the cover supporting the display, the electronic device can expand its display size approximately two times when is fully open and flat as compared to its closed position. That way, the offered electronic device is small, portable, and protected when needed, and, at the same time, the device can transform to a functional system with a relatively large display.

Further, the proposed electronic device includes various elements or components. For example, the cover of the electronic device may include I/O ports, memory, camera, speakers, and other elements that provide enhanced connectivity and functional capabilities of the electronic device.

In an example implementation, an electronic device is provided. The electronic device includes a cover and a flexible display. The cover includes a first section, a second section connected to the first section by a first connection mechanism, and a third section connected to the second section by a second connection mechanism. The flexible display is attached to at least a portion of the first section and a portion of the third section. The flexible display is positioned in a first orientation when the first and the third sections are in a plane and in a second orientation when the sections are in different planes.

In another example implementation, a portable computing device is provided. The portable computing device includes a seamless flexible display, a first section supporting at least a first portion of the flexible display, a second section connected to the first section by a first hinge, and a third section supporting at least a second portion of the flexible display. The third section is connected to the second section by a second hinge. The hinges are synchronized to rotate at least the first section and the second section and to convert the seamless flexible display between different orientations such as the flexible display transitions between a closed position, where the display forms two approximately equal halves, into an open position where a diagonal length of the flexible display is approximately double a diagonal length of each of the halves.

In yet another example implementation an electronic device cover is provided. The cover includes a first section, a second section connected to the first section by a first connection mechanism, and a third section connected to the second section by a second connection mechanism. The connection mechanisms are synchronized to rotate along two parallel axes to adjust positions of at least the first section and the third section from a first orientation, where an internal surface of the first section is in contact with an internal surface of the third section, to at least a second orientation where the internal surface of the first section is in not in contact with the internal surface of the third section.

As used herein, the terms "portable electronic device," "electronic device," and "portable computing device" may be used interchangeably and refer to any one of various tablets, smartphones, cellular telephones, personal data assistants (PDA's), laptops, computers, and other similar electronic devices that are generally movable and include at least a housing, a display screen, and a processor.

As used herein, the term "port" refers to any one of various openings that may be included in an electronic device and may include any of I/O or communication ports, multimedia ports, power ports, audio ports or jacks, memory card readers, or any other openings or ports that allow for communication and/or interaction with external devices or objects.

In the following detailed description, reference is made to the accompanying drawings, which form a part hereof, and in which is shown by way of illustration specific examples in which the disclosed subject matter may be practiced. It is to be understood that other examples may be utilized and structural or logical changes may be made without departing from the scope of the present disclosure. The following detailed description therefore, is not to be taken in a limiting sense, and the scope of the present disclosure is defined by the appended claims. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. It should also be noted that a plurality of hardware and software based devices, as well as a plurality of different structural components may be used to implement the disclosed methods and systems.

With reference to the figures, FIG. 1A is a perspective view of an electronic device 10 (also called an electronic computing device) in a first position, and FIG. 1B is a side view of the electronic device 10 in the first position according to an example implementation. The electronic device 10 includes a cover 15 and a flexible display 30 attached to at least a portion of the cover 15.

Figures 3A, 3B:
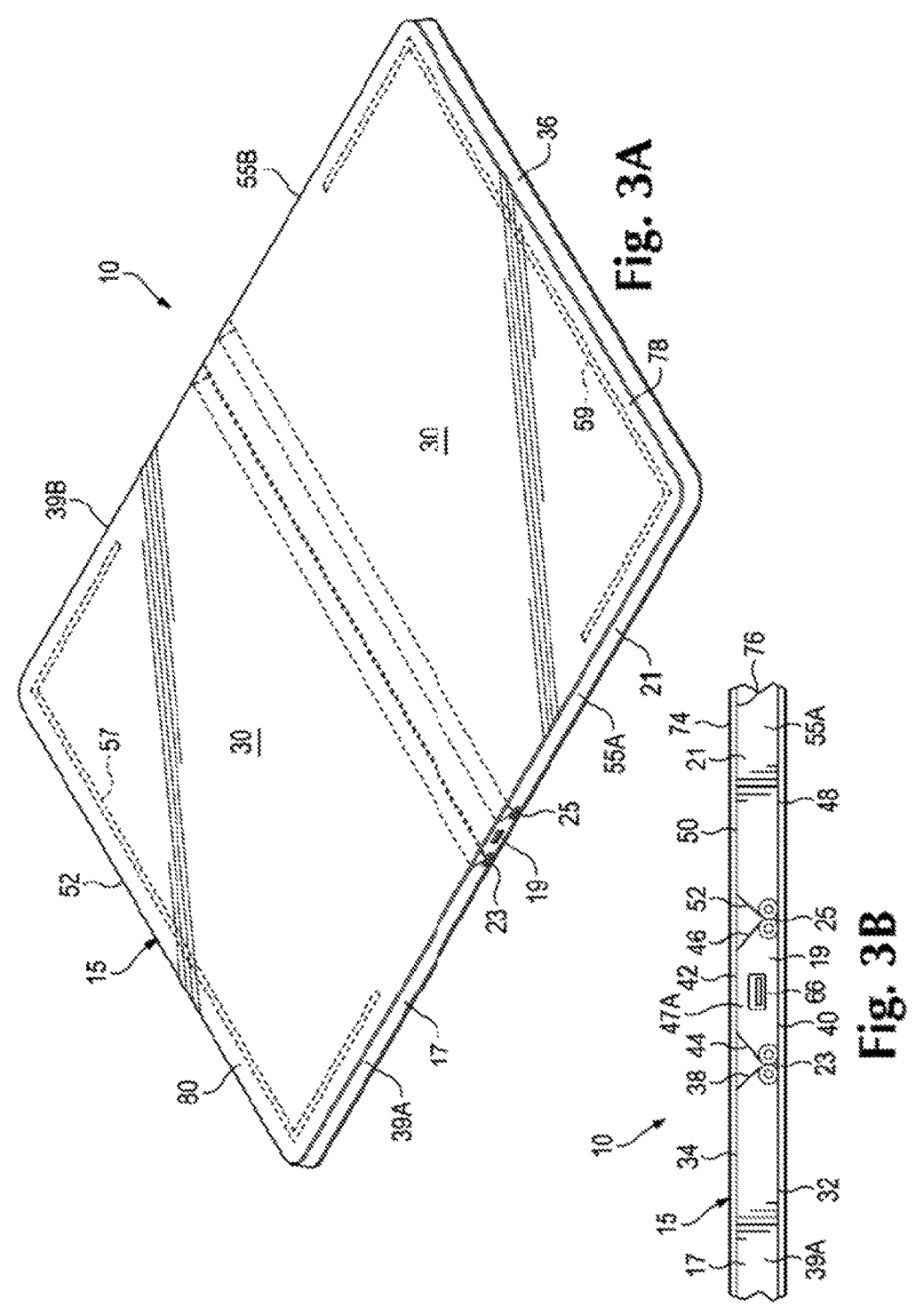

The specific details of the proposed electronic device 10 are explained in relation to FIGS. 1A-4. FIG. 2A is an alternative perspective view of the electronic device 10 in a second position and FIG. 2B is a side view of the electronic device 10 in the second position according to an example implementation. FIG. 3A is an alternative perspective view of the electronic device 10 in a third position and FIG. 3A is a side view of the electronic device 10 in the third position according to an example implementation. FIG. 4 is a perspective view of the electronic device cover 15 according to an example implementation.

As shown in FIGS. 1A-4, the cover 15 includes a first section 17, a second section 19, and a third section 21. The first section 17 is connected to the second section 19 by a first connection mechanism 23 and the third section 21 is connected to the second section 19 by a second connection mechanism 25. The cover 15 may be constructed from thermoplastic polyurethane ("TPU"), metal, plastic, fiber resin, or another suitable material. The cover may include resistance increasing components (i.e., legs, not shown) on a bottom surface of sections 17 and 21 for placing the electronic device on a surface such as desk or table. As explained in additional details below, the cover 15 may also include components of the electronic device 10 such as: I/O port(s), processor, battery, memory, antenna(s), speaker, camera, accelerometer(s), sensors, printed circuit board, or other applicable components (some components are shown in FIG. 4).

In one example, the first section and the third section 21 are substantially flat. In other examples, sections 17 and 21 may have different forms that are sufficient to movably connect them to the second section 19, to support the flexible display 30, and to transition the flexible display 30 between different orientations. The second section 19 may have a width that is substantially less than the width of sections 17 and 21 such as the cover 15 has the form of a binder. Sections 17, 19, and 21 may be constructed as one single piece or may be constructed as separate pieces that are attached to each other (e.g., via connection mechanisms 23 and 25). In addition, sections 17, 19, and 21 may include removable outer surfaces that can be replaced by the user.

For instance, a user may replace the outer surface of sections 17, 19, and 21 with surfaces that have different colors or include images in order to customize the cover 15.

With continued reference to FIGS. 1A-4, the first section 17 and the third section 21 may be substantially rectangular but in other implementations they may have different shapes. The first section 17 includes an external surface 32, an internal surface 34, a top surface 36, a bottom surface 39, and two side surfaces 39A-39B. The first section may include at least one antenna 60 and a main PCB 62 (i.e., a motherboard including CPU, memory, etc. (not shown) that connects with a flexible PCB 64 extending through sections 19 and 21. In other implementations, the first section 17 may include additional elements.

The second section 19 includes an external surface 40, an internal surface 42, a top surface 44, a bottom surface 46, and two side surfaces 47A-47B. The second section includes at least one port 66, a camera 68, a speaker (not shown), and a portion of the flexible PCB 64. The flexible PCB also extends through all the sections of the cover 15. In other implementations, the second section 19 may include additional elements.

The at least one port 66 may include any type of a port or an opening that allows for communication and/or interaction with external devices or objects. For example, the port 66 may include an HDMI port (e.g., full size HDMI, mini HDMI, micro HDMI etc.), a USB port (e.g., full size USB, mini USB, micro USB, power USB), a Thunderbolt port, a memory card reader slot, a DC power jack, a RJ-45 port, an audio jack or port (e.g., for headphone, microphones, etc.) or any other type of port. The electronic device 10 may also include various buttons or keys (e.g., power, volume, etc.), as well as different displays or indicators (e.g., to indicate charging, low battery, etc.). The cover 15 may further include electronic elements or circuits (not shown) that can facilitate the operation of the display 30 and the interaction between the electronic device 10 and any external devices.

The port 66 provides enhanced connectivity of the electronic device 10. For example, the electronic device may receive power through the port 66 and a user may power charge the electronic device 10. In addition, the port allows for a full spectrum of connection and communication capabilities between the device 10 and a variety of external accessories (e.g., a speaker, a mouse, etc.).

The third section 21 includes an external surface 48, an internal surface 50, a top surface 52, a bottom surface 54, and two side surfaces 55A-55B. The third section 21 includes a battery 70, a data storage 72 (e.g., hard disk drive, solid-state drive, solid state, hybrid drive, etc.), and a portion of the flexible PCB 64. In other implementations, the third section 21 may include additional elements.

Sections 17, 19, and 21 are movably connected to facilitate the transition of the device 10 between different positions (open, closed, etc.). The bottom surface 38 of the first section 17 connects to the top surface 44 of the second section 19 (e.g., via connection mechanism 23) and the bottom surface 46 of the second section 19 connects to the bottom surface 54 of the third section 21 (e.g., via connection mechanism 25). Thus, connection mechanisms 23 and 25 are synchronized to position the first section 17 and the third section 21 at matching acute angles to the second section 19 and to transition the flexible display 30 to a plurality of different orientations. The acute angle between the second section 19 and sections 17 and 21 (i.e., at surfaces 37/44 and 46/54) may vary ending on the position of the case 15 (i.e., open, closed, or intermediate).

The connection mechanisms 23 and 25 cornea sections 17 and 21 with the second section 19 and enable adjustment of the position of sections 17 and 21 and, consequently, of the flexible display 30. In one example, each of the connection mechanisms 23 and 25 includes a hinge extending along the length of sections 17, 19, end 21. In other examples, the connection mechanisms 23 and 25 may include a greater number of hinges (two, four, etc.) that extend along the length of sections 17, 19, and 21. In one implementation, each of the hinges may include two elongated barrels that interact with one another to adjust the position of sections 17 and 21. The elongated barrels may be securely engaged to each other with a support mechanism (e.g., a bracket, etc.) that may be positioned at different sections of the barrels. Alternatively, each of the barrels may include at least one gear that interacts with a gear in the other barrel to move the sections of the case 15 in different positions. Each of the barrels may also include at last one pin that securely connects the hinges to the sections of the cover 15. Thus, the connection mechanisms 23 and 25 are synchronized to rotate along two parallel axes to transition the flexible display attached to the cover 15 between different orientations (e.g., at least between a first orientation and a second orientation.

In other examples, the electronic device 10 may include other types of connection mechanisms to movably connect the sections of the case 15. Such mechanisms may include magnets, fasteners, clips, straps, pins, links, springs, hoops, or any other mechanism or combination of mechanisms that allows for a secure attachment and adjustment of sections 17 and 21. Regardless of the type of connector mechanism that is used, there is always a strong synchronized movable connection between sections 17 and 21 and section 19 of the cover 15. This synchronized operation of the connection mechanisms 23 and 25 allows a user to adjust the positions of the at least sections 17 and 21 and, consequently, to change the orientation of the flexible display 30 that is attached toile cover 15. In other words, sections 17 and 21 may open or "unfold" at the same rate but in opposite directions relative to the second section 19 until the flexible display 30 is fully open (e.g., it is substantially flat). In addition, sections 17 and 21 may be synchronized to "fold" or close with the same rate.

In one example, the flexible display 30 of the electronic device 10 has a seamless configuration (i.e., it is constructed from one whole display piece that is extends along the length of the cover 15 without any interruptions). The flexible display 30 includes a top surface 74 and a bottom surface 76. As explained in additional detail below, the display 30 is not fixed as the traditional flat screen displays but can transition between different orientations when a force is applied to the cover 15 supporting the display. The flexible display 45 may be an LCD (Liquid Crystal Display), OLED (organic light emitting display), an e-paper display, or another type of flexible display that can bend and transition between orientations. In one example, the display may be a touchscreen display that can be controlled by the user through simple or multi-touch gestures by touching the screen with at least one finger. The display 30 may include a protective layer, a touch layer, an air gap layer, and a display layer (not shown).

The flexible display 30 is attached to at least a portion of the first section 17 and a portion of the third section 21 (e.g., via an adhesive or any suitable connection mechanism). For example, at least two opposite portions of the bottom surface 76 of the flexible display 30 are attached to portions 57 and 59 of the first and the third sections 17 and 21 (shown in FIGS. 2A-B and 3A-B). Thus, the flexible display 30 may not be attached to entire area of the internal surfaces 34 and 50 or to the second section 19. That way, the display 30 can curve along an axis parallel to the length of second section 19 to transition between different orientations without completely bending (i.e., folding flat) the display 30. That configuration of the cover 15 and the display 30 protects the surface of the display 30 from a potential damage and allows for easier transition between the different orientations of the display 30. In alternative implementations, a portion of the flexible display 30 may be attached to the internal surface 42 of the second section 19. For instance, an edge of the display 30 may be attached to a center portion on the internal surface 42 of the second section 19.

Due to the attachment of the flexible display 30 to the cover 15 and to the movable configuration of the cover 15, the flexible display 30 may be positioned in multiple orientations. For example, the display 30 may be positioned in a first orientation when the first section 17 and the third sections 19 are in a plane and in a second orientation when the first and the third sections are in different planes. In one implementation, in the first orientation, the electronic device 10 is at a fully open position where the flexible display 30 is substantially flat (FIGS. 3A-3B). In that orientation, the first section 17 and the third section 21 are in the same plane. In addition, the second section 19 may be in the same pane as sections 17 and 21. In the first orientation, the user may utilize the device 10 as a media source (i.e., to watch movies, etc.) or working source (i.e., to perform various task or operations on the device).

In the second orientation, the electronic device 10 is in a closed position where a first portion 78 of the top surface 74 of the flexible display 30 is in contact with an opposite second portion 80 of the top surface 74. As shown in FIGS. 1A-1B, in the second orientation, the first section 17 and the third section 21 are in different planes. In addition, the second section is also in a different plane in relation to sections 17 and 21. In order to transition or convert the flexible display 30 between at least the first orientation and the second orientation, the first connection mechanisms 23 and 25 are synchronized to rotate along two parallel axes (i.e., the axes of mechanisms 23 and 25) and to move the first section 17 and the third section 21 that support the display 30.

As shown FIGS. 1A-1B, in the second orientation, the flexible display 30 is transitioned into two approximately equal halves, where the diagonal length of each of the halves is substantially half of the diagonal length of the flexible display 30 when the display is in the first orientation (FIGS. 3A-3B). In other words, in first orientation (i.e., in an open position) the diagonal length of the flexible display 30 is approximately double the diagonal length of each of the halves. For example, the diagonal length of the flexible display 30 in the first orientation may be between 5 and 20 inches, where other lengths are also possible. Thus, the diagonal length of each of the halves when the device is in the second orientation may be between 2.5 and 10 inches. In other implementations, the sizes of the two halves of the display 30 may be different such as the diagonal length of each of the halves may be more or less, than half of the diagonal length of the flexible display 30 when the display is in the first orientation. In the second orientation, the flexible display curves along an axis parallel to the length of second section 19 (i.e., an axis parallel to the axes of rotation of connection mechanism 23 and 25) to transition into the two halves when the user moves sections 17 and 21 of the cover 15.

Therefore, the configuration of the device 10 allows a user to "fold" the cover 15 and the display 30 together when the device is not used. That way, the electronic device 10 becomes smaller in size and the display 30 is protected during transportation of the device 10. In addition, the electronic device 10 can expand its display size approximately two times when it is fully open and substantially flat as compared to the closed position.

The connection mechanisms 23 and 25 are further synchronized position the first section 17 and the third section 21 at matching acute angles in relation to the second section 19. Because the mechanisms 23 and 25 are synchronized, they open evenly across the two separate axes of mechanisms 23 and 25. Thus, the operation of the connection mechanisms 23 and 25 transitions the flexible display 30 to a plurality of different third orientations where the first portion 78 of the top surface 74 of the flexible display 30 is not in contact with the second portion 80 of the top surface 74. FIGS. 2A and 2B illustrate one example of the third orientation of the display 30 where the display is transitioning from the first orientation (i.e., open position) to the second orientation (i.e., closed position). In addition, the display 30 may be adjusted to various other third orientations that are positioned between the first and the second orientations. In the plurality of the third orientations, the first section 17 and the third section 21 are in different planes. The flexible display 30 curves along an axis parallel to the length of second section 19 (i.e., an axis parallel to the axes of rotation of connection mechanism 23 and 25) to transition into the two halves when the display 30 is in any of the plurality of third orientations.

Therefore, the proposed configuration of the device 10 allows a user to view and use the electronic device 10 in a plurality of different orientations without the hassle of adjusting any supporting elements of the device 10 (e.g., stand, etc.). Further, the plurality of elements embedded in the cover 15 (e.g., ports, speakers, etc.) of the proposed device 10 enhance the operating capabilities of the electronic device 10 and users may operate the electronic device 10 as their main device.

Some of the advantages described above in relation to the electronic device 10 also apply to the cover 15 shown in FIG. 4. In particular, the connection mechanisms 23 and 25 of the cover 15 are synchronized to rotate along two parallel axes to adjust the positions of at least the first section 17 and the third section 21 from a first orientation, where the internal surface 34 of the first section 17 is in contact with an internal surface 50 of the third section 21, to at least a second orientation where the internal surface 34 of the first section 17 is in not in contact with the internal surface 50 of the third section 21. The cover 15 may further include at least one attachment mechanism (e.g., adhesive, mechanical attachment, etc., not shown) to attach a flexible display (e.g., the display 30) to at least a portion of the first section 17 and a portion the third section 21 of the cover.

What is claimed is:

1. An electronic device comprising:
a cover including
a first section,
a second section connected to the first section by a first connection mechanism, and
a third section connected to the second section by a second connection mechanism;
a flexible display attached to a portion of the first section and a portion of the third section, the flexible display positioned in a first orientation when the first and the third sections are in a plane and in a second orientation when the first and the third sections are in different planes, wherein the first connection mechanism and the second connection mechanism are synchronized to rotate along two parallel axes to transition the flexible display between the first orientation and the second orientation, and wherein in the first orientation the flexible display is substantially flat, and wherein in the second orientation a first portion of a top surface of the flexible display is in contact with a second portion of the top surface of the flexible display; and a battery embedded in one of the sections of the cover, a communication port embedded in the second section between the first connection mechanism and the second connection mechanism, a printed circuit board extending through the first, second, and third sections of the cover, and a camera positioned in the second section between the first connection mechanism and the second connection mechanism.

2. The electronic device of claim 1, wherein the first and second connection mechanisms are further synchronized to position the first and the third sections at matching acute angles in relation to the second section, and to transition the flexible display to a plurality of different third orientations where the first portion of the top surface of the flexible display is not in contact with the second portion of the top surface.

3. The electronic device of claim 1, wherein in the second orientation the flexible display is transitioned into two approximately equal halves, and wherein a diagonal length of each of the halves is substantially half of a diagonal length of the flexible display when the display is in the first orientation.

4. The electronic device of claim 3, wherein the flexible display is seamless, and wherein the flexible display curves along an axis to transition into the two halves when the flexible display is in the second orientation or the flexible display is in one of the plurality of third orientations.

5. A portable computing device comprising:
a seamless flexible display;
a first section supporting a first portion of the flexible display;
a second section connected to the first section by a first connection mechanism;
a third section supporting a second portion of the flexible display, the third section connected to the second section by a second connection mechanism,
wherein the first and second connection mechanisms are synchronized to rotate along two parallel axes to adjust positions of the first section and the second section and to convert the seamless flexible display between different orientations to transition the flexible display between a closed position where a first part of the flexible display is folded over a second part of the flexible display such that a first portion of a top surface of the flexible display is in contact with a second portion of the top surface of the flexible display, an open position where the flexible display is flat, and an angled position where the first part of the flexible display is angled with respect to the second part of the flexible display;
a communication port embedded in the second section between the first connection mechanism and the second connection mechanism; and
a flexible circuit board extending through the first section, the second section, and the third section.

6. The portable computing device of claim 5, wherein when the flexible display is in the open position the first and the third sections are in a plane, and when the flexible display is in the closed position the first and the third sections are in different planes.

7. The portable computing device claim 6, wherein the flexible display is curved along an axis parallel to the two parallel axes of rotation of the first and second connection mechanisms when the flexible display is in the angled position.

8. The portable computing device of claim 7, wherein the first, second, and third sections include removable outer surfaces that are replaceable.

9. The portable computing device of claim 5, wherein the flexible printed circuit board is curved when the first and third sections are in different planes.

10. An electronic device cover comprising:
a first section;
a second section connected to the first section by a first connection mechanism;
a third section connected to the second section by a second connection mechanism,
wherein the first and second connection mechanisms are synchronized to rotate along two parallel axes to adjust positions of the first section and the third section from a first position where the first section is folded over the third section, to a second position where the first section is flat relative to the third section;
a flexible display attached to a portion of the first section and a portion of the third section, the flexible display positioned in a first orientation when the first and the third sections are in the second position and in a second orientation when the first and the third sections are in the first position, wherein the first connection mechanism and the second connection mechanism are to transition the flexible display between the first orientation and the second orientation, and wherein in the first orientation the flexible display is substantially flat, and wherein in the second orientation a first portion of a top surface of the flexible display is in contact with a second portion of the top surface of the flexible display;
a communication port embedded in the second section between the first connection mechanism and the second connection mechanism; and
a printed circuit board extending through the first, second, and third sections.

11. The electronic device cover of claim 10, further comprising an attachment mechanism to attach a flexible display to a portion of the first section and a portion of the third section, the flexible display being flat when the first and the third sections are in a plane and curved when the first and the third sections are in different planes.

12. The electronic device cover of claim 10, further comprising a battery embedded in one of the first, second, and third sections of the electronic device cover.

13. The electronic device cover of claim 10, wherein the first, second, and third sections include removable outer surfaces that are replaceable.

14. The electronic device cover of claim 10, wherein the printed circuit board is a flexible printed circuit board.

15. The electronic device cover of claim 14, wherein the flexible printed circuit board is curved when the first second and third section are in the first orientation.

* * * * *

UNITED STATES PATENT AND TRADEMARK OFFICE
CERTIFICATE OF CORRECTION

PATENT NO. : 10,013,020 B2
APPLICATION NO. : 15/109908
DATED : July 3, 2018
INVENTOR(S) : Insun Hong et al.

Page 1 of 1

It is certified that error appears in the above-identified patent and that said Letters Patent is hereby corrected as shown below:

In the Claims

In Column 10, Line 6, Claim 7, after "device" insert -- of --.

In Column 10, Line 62, Claim 15, delete "first" and insert -- first, --, therefor.

Signed and Sealed this
Sixth Day of November, 2018

Andrei Iancu
*Director of the United States Patent and Trademark Office*